United States Patent [19]
Gabara

[11] Patent Number: 5,731,711
[45] Date of Patent: Mar. 24, 1998

[54] INTEGRATED CIRCUIT CHIP WITH ADAPTIVE INPUT-OUTPUT PORT

[75] Inventor: Thaddeus John Gabara, Murray Hill, N.J.

[73] Assignee: Lucent Technologies Inc., Murray Hill, N.J.

[21] Appl. No.: 672,494

[22] Filed: Jun. 26, 1996

[51] Int. Cl.$^6$ ..................................................... H03K 17/16
[52] U.S. Cl. ................................. 326/30; 326/27; 326/86
[58] Field of Search ................................. 326/21, 26, 27, 326/30, 37, 82, 86

[56] References Cited

U.S. PATENT DOCUMENTS

| | | | |
|---|---|---|---|
| 5,194,765 | 3/1993 | Dunlop et al. | 307/443 |
| 5,243,229 | 9/1993 | Gabara et al. | 307/98 |
| 5,294,845 | 3/1994 | McMahan et al. | 326/27 X |
| 5,298,800 | 3/1994 | Dunlop et al. | 307/270 |
| 5,481,207 | 1/1996 | Crafts | 326/30 X |
| 5,528,168 | 6/1996 | Kleveland | 326/86 X |
| 5,578,939 | 11/1996 | Beers et al. | 326/82 X |
| 5,596,285 | 1/1997 | Marbot et al. | 326/30 |
| 5,621,335 | 4/1997 | Andresen | 326/30 |
| 5,654,895 | 8/1997 | Bach et al. | 364/482 |

OTHER PUBLICATIONS

T.J. Gabara, "Ground Bounce Control in CMOS Integrated Circuits", *Digest of technical Papers –IEEE International Solid–State Circuits Conference*, pp. 88–89 (1988).

H.B. Bakoglu, *Circuits, Interconnections, and Packaging for VLSI*, Ch. 6, pp. 226–274, (Addison–Wesley Publishing Co. 1990).

"High Speed Transceiver Logic (HSTL) –A 1.5 V Output Buffer Supply Voltage Based Interface Standard for Digital Integrated Circuits", *Electronic Industries Association*, EIA/JEDEC Standard 8–6 (Aug. 1995).

B. Gunning et al. "A CMOS Low–Voltage–Swing Transmission–Line Transceiver, *Digest of Technical Papers –IEEE International Solid–State Circuits conference*". pp. 58–59 (1992).

"Gunning Transceiver Logic (GTL)–Low–Level, High–Speed Interface Standard for Digital Integrated Circuits", *Electronic Industries Association*, EIA/JEDEC Standard 8–3 (Nov. 1993).

T.J. Gabara et al. "Forming Damped LRC Parasitic Circuits in Simultaneously Switched CMOS Output Buffers", *IEEE 1996 Custom Integrated Circuits Conference*, pp. 277–280.

M.S.J. Steyaert, et al. "ECL–CMOS and CMOS–ECL Interface in 1.2–µm CMOS for 150–MHz Digital ECL Data Transmission Systems", *IEEE Journal of Solid–State Circuits*, vol. 26, No. 1, pp. 18–23 (1991).

Primary Examiner—David R. Hudspeth
Attorney, Agent, or Firm—Robert E. Rudnick

[57] ABSTRACT

A controllable impedance arrangement is used in an adaptable input-output port of an integrated circuit configuration to enable the port to advantageously adapt its impedance according to whether its transmitting or receiving a communication signal. The controllable impedance arrangement provides different specific impedances for transmitting signals at respective signal levels, or a terminating impedance when receiving a data signal. This impedance arrangement enables the input-output port and corresponding integrated circuit to have compact dimensions relative to conventional integrated circuits.

10 Claims, 3 Drawing Sheets

INTEGRATED CIRCUIT CHIP WITH ADAPTIVE INPUT-OUTPUT PORT

FIELD OF THE INVENTION

The invention relates to integrated circuit chips in general and more specifically to input-output sections of such chips.

BACKGROUND OF THE INVENTION

Integrated circuit chips having the ability to provide interchip communication at higher speeds and with lower power dissipation is an ever present goal for chip and system manufacturers. Presently, transistors in integrated circuit chips are capable of providing a switching performance for high speed data transmission that is greater than the ability of common wire interconnects to convey such data between integrated circuit chips. More specifically, the switching performance of metal oxide semiconductor transistors having gate widths of 1 µm or less can produce data for transmission at rates on the order of 1 Gbit/s which exceeds the capabilities of conventional interconnects, such as dual-in-line packages, stitch-bond wires, and conventional metal traces on printed circuit boards (PCBs). Several limitation on the data rates achievable over such interconnects include ground bounce and signal reflections.

Ground bounce is typically produced when a large number of output drivers of a chip switch simultaneously. This simultaneous switching causes a transient current to appear in the chip's ground and power distribution systems that can cause false switching of chip's devices and corresponding system errors or loss of data. A more detailed discussion of inductive noise is provided in T. J. Gabara, "Ground Bounce Control in CMOS Integrated Circuits", *Digest of Technical Papers—IEEE International Solid-State Circuits Conference*, pp. 88–89 (1988), which is incorporated by reference herein.

In conventional systems, ground bounce is typically maintained to negligible levels by limiting transmitted signal rise and fall rates to at most 1 ns/V to 2 ns/V. As a consequence, the typical large voltage swings of 5 V representing logic states transitions in a data signal requires an often undesirably long 5 ns to 10 ns. Such transition times limit corresponding data rates to at most approximately 25 Mbits/s to 50 Mbits/s. Moreover, such relatively large voltage swings have undesirably high power dissipation typically on the order of hundredths of milliwatts. Several existing systems, such as those systems that conform to high-speed-transceiver-logic (HSTL) or Gunning-transceiver-logic (GTL) communication standards reduce power dissipation and switching times by employing a voltage swing of less than 1 V. As a consequence, the achievable data rates are increased by a corresponding factor greater than five.

Moreover, at data rates as low as 100 Mbits/s, discontinuities in the interconnect causes a problem of reflecting a portion of a transmitted data signal back to the transmitting integrated circuit. Such signal reflection often destructively combines with the transmitted signal to degrade the signal received by a destination integrated circuit. Transmission line structures have been employed for interconnects in systems to reduce such discontinuities. In such systems, a discrete terminating resistor is often coupled to a transmission line proximate an input buffer of a receiving integrated circuit. The terminating resistor has an impedance that matches the transmission line's characteristic impedance in order to substantially reduce discontinuities and corresponding signal reflections caused by the input buffer-transmission line interface. The use of transmission line structures for interconnects are described in greater detail in H. B. Bakoglu, *Circuits, Interconnections, and Packaging for VLSI*, Ch. 6, pp. 226–273 (Addison-Wesley Publishing Co. 1990), which is incorporated by reference herein.

However, conventional integrated circuit and system configurations providing bi-directional communication over individual transmission lines disadvantageously dissipate twice the power as uni-directional transmission line configurations. The increased power dissipation is due to the corresponding use of terminating resistors at both ends of the transmission line by the respective input-output ports of the integrated circuits. Although such resistors reduce signal reflections when such ports receive data signals, these resistors undesirably draw additional DC current when the input-output ports transmit data signals causing the increased power dissipation. Uni-directional interconnect configurations, although requiring less power, also undesirably require twice the number of communication ports, e.g., separate input ports and output ports, as well as twice the number of interconnects between communicating chips compared to bi-directional interconnect configurations. Moreover, the discrete terminating resistors used in both the unidirectional and bi-directional configurations substantially add to the size and complexity of the PCB of the corresponding system.

As a consequence, there is a recognized need for a bi-directional integrated circuit communication arrangement having compact dimensions that reduces the need for discrete resistors on the PCB.

SUMMARY OF THE INVENTION

The invention is based on the discovery that compact dimensions and other desirable features, such as relatively low power dissipation or reduced number of power supplies, are achievable by disposing an on-chip controllable impedance arrangement within an integrated circuit input-output port. This controllable impedance arrangement enables the port to advantageously adapt its impedance according to whether its transmitting or receiving a communication signal. The controllable impedance arrangement provides different specific impedances for transmitting signals at respective signal levels, or a terminating impedance when receiving a data signal. The use of this impedance arrangement within a chip's input-output port substantially reduces and typically eliminates the need to employ external discrete terminating resistors thereby achieving compact dimensions and facilitating a reduction of complexity of the corresponding PCB.

More specifically, the controllable impedance arrangement which can, for example, be a configuration of switchable impedance elements, provides respective impedance values coupled to a communications line, an input buffer and at least two power supplies within the input-output port. As used herein, the term "input buffer" refers generally to a device, circuit or configuration that detects an input signal for an integrated circuit whether or not such device, circuit or configuration retains signal levels of such signal for further processing or operation. When the port is operating as an input port, the impedance arrangement provides a terminating impedance for the communications line. Conversely, when transmitting data signals, the impedance arrangement connects different impedances between the communications line and the power supplies or disconnects the communications line from the power supplies to produce a desired signal level on the communication line.

The invention is also advantageous in interchip communications adhering to high speed communication standards including existing standards for, such as, for example, complementary metal oxide semiconductor (CMOS), emitter-coupled-logic (ECL), transistor-transistor-logic (TTL), Gunning-transceiver-logic (GTL), low-voltage-differential-swing (LVDS), pseudo-emitter-coupled-logic (PECL) and high-speed-transceiver-logic (HSTL).

Additional features and advantages of the present invention will become more readily apparent from the following detailed description and accompanying drawings.

DETAILED DESCRIPTION

The invention is based on the use of a controllable impedance arrangement in an integrated circuit input-output port to enable the port to advantageously adapt its impedance according to whether its transmitting or receiving a communication signal. More specifically, the on-chip controllable impedance arrangement provides different specific impedances for transmitting signals at respective signal levels, or a terminating impedance when receiving a data signal.

In the input-output port, the impedance arrangement is coupled to an input buffer, the communication line and at least two power supplies of the integrated circuit. In this manner, the controllable impedance arrangement can provide a terminating impedance when receiving data signals for the input buffer to minimize reflections at the coupling of the input-output port to the communication line. As used herein, the term "input buffer" refers generally to a device, circuit or configuration that detects an input signal for an integrated circuit whether or not such device, circuit or configuration retains signal levels of such signal for further processing or operation.

Figure 3:
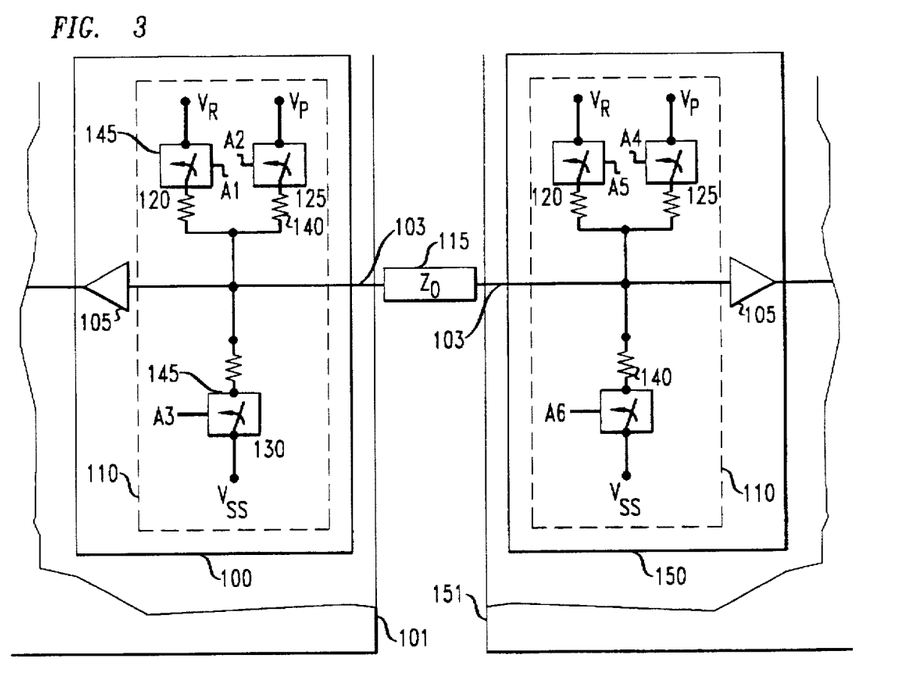
FIG. 3 illustrates a schematic block diagram of an exemplary integrated circuit chip arrangement for bi-directional communications in accordance with the invention.
Figure 4:
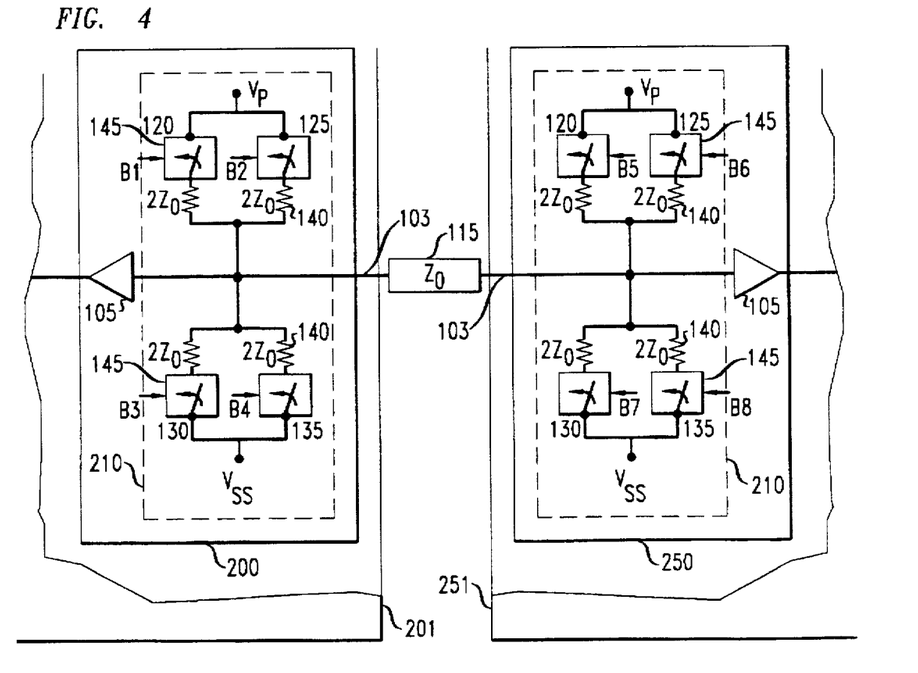
FIG. 4 illustrates a schematic block diagram of an exemplary alternative embodiment of the integrated circuit chip configuration of FIG. 3.
Figure 5:
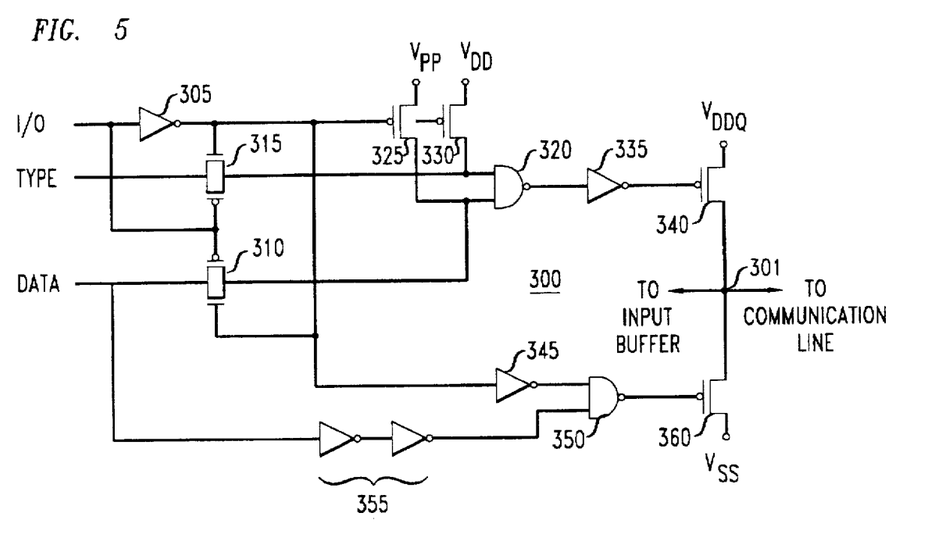
FIG. 5 illustrates a schematic block diagram of an exemplary alternative embodiment of a controllable impedance arrangement used in FIGS. 3 and 4.

The controllable impedance arrangement can also provide respective power divider configurations between the communication line and the two power supplies to produce and transmit corresponding data signals of particular signal levels on the communication line. This impedance arrangement can also be implemented to provide other advantageous features, such as, for example, reduced power dissipation or reduced number of power supplies, to provide such configurations using relatively compact dimensions and facilitating the use of system substrates, such as printed circuit boards (PCBs) or multi-chip modules (MCMs) having reduced complexity Numerous integrated circuit chip configurations can be employed for providing the controllable impedance arrangement in an integrated circuit input-output port in accordance with the invention. Exemplary adaptive input-output port configurations according to the invention using different controllable impedance arrangements are shown in FIGS. 3, 4, and 5. However, these depicted circuit configurations are for illustration purposes only and not meant to be limitations on the invention.

Figure 1:
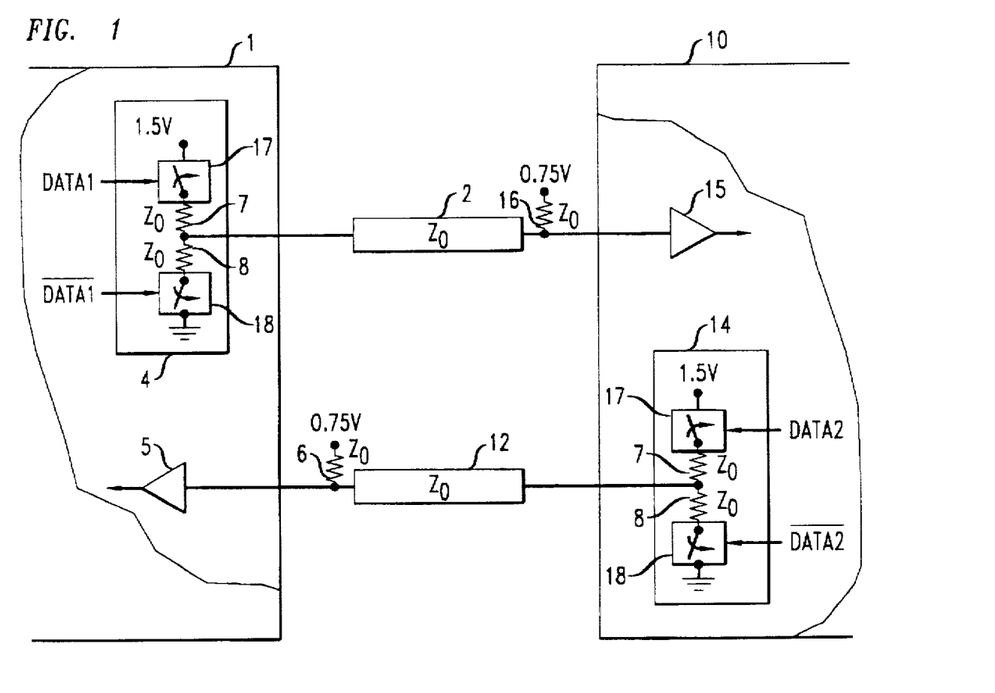
FIGS. 1 and 2 illustrate schematic block diagrams of conventional integrated circuit chip arrangements for unidirectional and bi-directional communications, respectively.
Figure 2:
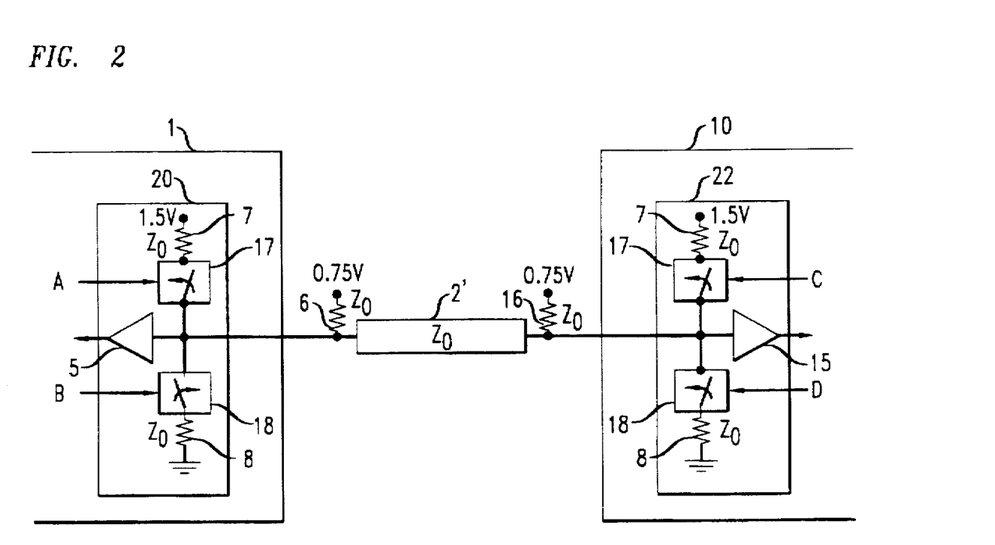

In order to appreciate the reduced power dissipation achievable in accordance with one embodiment of the invention, shown in FIG. 3, power dissipation of conventional uni-directional and bi-directional input-output ports adhering to the high-speed-transceiver-logic (HSTL) standard are described with regard to FIGS. 1 and 2, respectively. The HSTL standard is described in greater detail in "High Speed Transceiver Logic (HSTL)—A 1.5 V Output Buffer Supply Voltage Based Interface Standard for Digital Integrated Circuits", *Electronic Industries Association*, EIA/ JEDEC Standard 8-6 (August 1995), which is incorporated by reference herein. FIG. 1 depicts a conventional unidirectional communication configuration. In FIG. 1, a first integrated circuit 1 can send a communication signal to a second integrated circuit 10 over a first interconnect 2. Likewise, the second integrated circuit 10 can send a communication signal to the first integrated circuit over a second interconnect 12.

The interconnect 2 connects an output driver 4 of the first integrated circuit 1 to an input buffer 15 of the second integrated circuit 10 and the interconnect 12 connects an output driver 14 of the second integrated circuit 10 to an input buffer 5 of the first integrated circuit 1. Further, the interconnects 2 and 12 have conventional transmission line structures with respective characteristic impedances $Z_0$. The respective input buffers 5 and 15 and output drivers 4 and 14 enable bi-directional communication between the integrated circuits 1 and 10 over the two interconnects 2 and 12.

Terminating resistors 6 and 16 having impedances matching the characteristic impedance $Z_0$ of the corresponding transmission lines 2 and 12 are connected between a 0.75 V voltage source and the lines 2 and 12 proximate the input buffers 5 and 15. The terminating resistors 6 and 16 substantially reduce undesirable signal reflections caused by discontinuities at the connections between the input buffers 5 and 15 and the lines 2 and 12. Each output driver 4 and 14 includes two resistors 7 and 8 connected to the corresponding lines 2 and 12 as well as respective switches 17 and 18. The switches 17 and 18 are further connected to a voltage source of 1.5 V and ground, respectively. Each of the resistors 7 and 8 also have impedances $Z_0$ matching the characteristic impedance of the transmission line 1.

In operation, switches 17 and 18 are alternatively closed based on a control signal DATA and its inverse $\overline{\text{DATA}}$ to generate a signal on the respective lines 2 and 12 of approximately 1.125 V or 0.375 V representing a high or low signal or logic level. The power dissipated for transmitting each of these respective high or low signal levels is: $P=V^2/R=(0.75 \text{ V})^2/(2 Z_0)\text{W}$, which is 5.6 mW per transmission line if the characteristic impedance $Z_0$ of the transmission lines 2 and 12 are 50 Ω.

Further, a conventional HSTL bi-directional interconnect scheme between first and second input/output ports of the integrated circuits 1 and 10, shown in FIG. 2, uses a more compact, single transmission line 2' instead of the two lines 2 and 12 shown in FIG. 1, but dissipates twice the power than the configuration shown in FIG. 1, or 11.2 mW for a transmission line 2' having a characteristic impedance $Z_0$ of 50 Ω. Similar components in FIGS. 1 and 2 are like numbered for ease of illustration, for example, the integrated circuits 1 and 10, resistors 7 and 8, and switches 17 and 18. In FIG. 2, input/output ports 20 and 22 of the first and second integrated circuits 1 and 10 are connected to the transmission line 2'.

The input/output ports 20 and 22 correspond to a combination of the input buffers 5 and 15 and output drivers 4 and 14, shown in FIG. 1, that is connected to a common transmission line. However, the resistors 7 and 8 have impedances that correspond to $Z_0/2$, i.e., one-half the impedance value of the corresponding resistors in the uni-directional configuration of FIG. 1. Also, terminating resistors 6 and 16 having impedances $Z_0$ matching the characteristic impedance of the transmission line 2' are connected between a 0.75 V voltage source and the line 2' proximate the ports 20 and 22 to facilitate detection when receiving a signal.

In operation, switches 17 and 18 are alternatively closed for transmitting a data signal or both opened when receiving a data signal. The operation of the respective switches 17 and 18 in the integrated circuit chips 1 and 10 is controlled by control signals A, B, C and D. In order to maintain the same high and low signal levels of 1.125 V and 0.375 V for transmitting a signal as in the uni-directional configuration of FIG. 1, the impedance values of the resistors 7 and 8 in the input-output ports 20 and 22 are one-half their values in the uni-directional configuration due to the additional DC current draw of the terminating resistors 6 and 16 when either port 20 or 22 is transmitting data. As a consequence, the corresponding dissipated power for such a bi-directional configuration is: $P=V^2/R=(0.75\ V)^2/Z_0$ W, or 11.2 mW if characteristic impedance $Z_0$ of the transmission line 2' is 50 $\Omega$. Such a power dissipation is twice that of the uni-directional configuration of FIG. 1.

In contrast, an adaptive input-output port of an integrated circuit chip configuration in accordance with the one embodiment of the invention is able to provide bi-directional communication over a single interconnect with reduced power dissipation relative to conventional bi-directional configurations, such as that shown in FIG. 2. Moreover, it is possible for such adaptive input-output ports to provide a power dissipation on the order of approximately the power dissipation of a conventional uni-directional configuration, such as that shown in FIG. 1. Exemplary adaptive input-output ports 100 and 150 of first and second integrated circuits 101 and 151 in accordance with such an embodiment of the invention are shown in FIG. 3.

The use of adaptive input-output ports 100 and 150 for communicating over a single communication line 115 are for illustration purpose only and is not meant to be a limitation of the invention. It should be readily understood that integrated circuit chips according to the invention may typically have a greater number of adaptive input-output ports. Moreover, it is possible for such an input-output port to transmit and receive a communication signal with other bi-directional ports, such as the conventional input-output ports shown in FIG. 2. It is possible for the integrated circuits 101 and 151 to be disposed on a substrate, such as for example, a printed circuit board or multichip module, which also maintains the structure of the communication line 115.

Each adaptive input-output ports 100 and 150 includes an input buffer 105, and a controllable impedance arrangement within dashed outline 110 coupled to an interface 103 connected to the communication line 115. As used herein, interface 103 refers generally to an electrically-conducting element that enables coupling of the impedance arrangement 110 to the communication line 115. It is possible for the interface 103 to be a metal trace or to provide electrical impedance between the coupled arrangement 110 and the line 115. It is possible for the communication line 115 to have a transmission line structure with a characteristic impedance $Z_0$. As used herein, a transmission line refers to any wiring that can transmit a signal from one point to another, substantially regardless of the ratio of the signal velocity to the signal frequency. Exemplary configurations for the input buffer 105 include those configurations typical employed within conventional integrated circuit. Such input buffers are described in greater detail in B. Gunning et al. "A CMOS Low-Voltage-Swing Transmission-Line Transceiver, *Digest of Technical Papers—IEEE International Solid-State Circuits Conference*, pp. 58–59 (1992), which is incorporated by reference herein.

Each controllable impedance arrangement 110 includes three switchable impedance elements 120, 125, and 130 connected to respective power supplies $V_R$, $V_P$ and $V_{SS}$. Each switchable impedance element 120, 125, and 130 should be switchable to provide a respective impedance value between the respective power supply and the interface 103. Each impedance element 120, 125, and 130 should also be switchable to provide an open circuit between the respective power supply and the interface 103.

Thus, each switchable impedance element 120, 125 and 130 is schematically represented by impedance element 140 connected to switch 145. In the exemplary embodiment shown in FIG. 3, the impedance elements can be activated to provide the impedance $Z_0$ between the respective components based on control signals A1, A2 and A3 for the port 100, as well as A4, A5 and A6 for the port 150. Accordingly, it is possible to employ an on-chip impedance element such as, for example, a resistor, resistor-inductor combination, and/or a resistor-capacitor combination for the impedance element 140, and a switch, such as a conventional integrated circuit transistor switch, for the switch 145.

Other integrated circuit configurations can be employed for the switchable impedance elements 120, 125 and 130 including, for example, other passive element configurations as well as active impedance elements that are capable of performing both the switching function and providing the desired impedance value, such as the active resistive devices described in U.S. Pat. Nos. 5,194,765, 5,243,229 and 5,298,800, which are assigned to the assignee of this invention and which are incorporated by reference herein. Such active impedance elements can be employed individually, or in a parallel, cascaded or series configuration to provide the desired switchable impedance value. For HSTL communication according to the arrangement of FIG. 3, each of the impedance elements 140 should have an impedance $Z_0$ corresponding to the characteristic impedance $Z_0$ of the communication line 115.

The power provided by the power supplies $V_P$ and $V_{SS}$ should be selected based on the desired first and second signal levels on the communications line 115 and the impedance values employed for the impedance elements 120, 125 and 130 of the chips 101 and 151. It is possible for the second power supply $V_{SS}$ to be the chip ground of the respective chip 101 and 151. Also, the power provided by the power supply $V_R$ should be sufficient to provide a desired biasing of a terminating impedance. Accordingly, in order to avoid a noise floor and ceiling of the input buffers 105 for the respective first and second signal levels, it is advantageous to employ a power provided by the power supply $V_R$ such that $(V_R - V_{SS})$ is substantially equal to $(V_P - V_{SS})/2$.

In the exemplary arrangement shown in FIG. 3 with the impedance elements 120, 125 and 130 have impedances substantially equal to the characteristic impedance $Z_0$ of the communications line 115 and with the powers ($V_R$-$V_{SS}$) being substantially equal to ($V_P$-$V_{SS}$)/2, a communication signal can be produced on the line 115 by either port 100 or 150 with a signal magnitude of 0.75($V_P$-$V_{SS}$) Or 0.25($V_P$-$V_{SS}$). Thus, if the ports 100 and 150 adhere to the HSTL standard, power source voltages of $V_P$-$V_{SS}$=1.5 V can be used to produce first and second signal levels of 1.125 V and 0.375 V, respectively, which corresponds to those used in the conventional HSTL configurations, shown in FIGS. 1 and 2.

In operation, each port 100 or 150 can be configured to an input configuration for receiving a communication signal from the other port by activating the impedance element 120 while deactivating the elements 125 and 130. Further, the ports 100 or 150 can be configured to transmit a communication signal at a first signal level by activating impedance element 125 while deactivating impedance elements 120 and 130. Likewise, the port 100 or 150 can be configured to transmit a communication signal at a second signal level by activating impedance element 130 while deactivating impedance elements 120 and 125.

Thus, in order for the port 100 to transmit a communication signal to the port 150, the port 150 is configured in its input configuration and the port 100 is configured in either its transmit-first or -second signal level configurations to transmit a corresponding communication signal. Likewise, the port 100 can be configured in its input configuration and the port 150 can be configured in either its transmit-first or -second signal level configurations to transmit a corresponding communication signal to the port 100. The input-output port configuration shown in FIG. 3 has a power dissipation of $P=V^2/R=(V_R-V_{SS})^2/2Z_0$. Thus, for a HSTL system having the power supplies providing the powers $V_R$-$V_{SS}$=0.75 V and a communication line characteristic impedance $Z_0$ of 50 Ω, the power dissipation would be 5.6 mW. Such a power dissipation is one-half that of the conventional bi-directional configuration of FIG. 2 and substantially equal to that of the uni-directional configuration of FIG. 1.

It is possible for the chips 101 and 151 to communicate with one another to alert the other that it is going to transmit a communication signal such that the other chip can implement an input configuration. Alternatively, a controller, processor or line arbitrator separate from the chips 101 and 151 can control the whether the chips can transmit or receive communication signals over the line 115. Further, although the ports 100 and 150 are described with respect to specific impedance values and power supply magnitudes, such as the voltage difference of $V_P$-$V_{SS}$, it should be readily understood that various different impedance elements and power values can be used to produce the desired transmission signal levels or terminating impedance values in accordance with the invention.

An exemplary alternative input-output port embodiment of the invention that can provide substantially the same functions as the configuration shown in FIG. 3 but relying on a reduced number of power supplies is illustrated in FIG. 4. In particular, the embodiment shown in FIG. 4 is capable of operating based on two power supplies $V_P$ and $V_{SS}$ instead of the three power supplies $V_P$, $V_R$ and $V_{SS}$ used by the embodiment of FIG. 3. Similar components in FIGS. 3 and 4 are like numbered for clarity, for example, the input buffers 105, interface 103 and communication line 115. In FIG. 4, input-output port configurations 200 and 250 of respective integrated circuit chips 201 and 251 are coupled by interface 103 to the communication line 115 having the characteristic impedance $Z_0$. A controllable impedance arrangement 210 couples the interface 103 and the input buffer 105 within each port 200 and 250.

Each controllable impedance arrangement 210 includes two groups of switchable impedance elements 120 and 125, and 130 and 135. The elements 120 and 125 are connected in a parallel manner between the interface 103 and a first power supply $V_P$ of the integrated circuit chip 201. In a similar manner, the elements 130 and 135 are connected in a parallel manner between the interface 103 and a second power supply $V_{SS}$ of the integrated circuit chip 201. The power supplied by the power supply $V_P$ should correspond to a first desired signal level for a signal transmitted by the chip 201. Likewise, the power supplied by the power supply $V_{SS}$ should correspond to a second desired signal level for a data signal transmitted by the chip 201. It is possible for the second power supply $V_{SS}$ to be the relative chip ground of the integrated circuit chip 201.

Each switchable impedance element 120, 125, 130 and 135 is schematically represent by an impedance element 140 and a switch 145 and effectively operates in a like manner to the elements 120, 125 and 130, shown in FIG. 3, by selectively providing an impedance or a substantial open circuit between the respective power supply $V_P$ and $V_S$ and the interface 103. The particular components useable for switchable impedance elements 120, 125, 130 and 135 include those previously described with respect to the impedance element 120, 125 and 130 of FIG. 3. For HSTL communication according to the arrangement of FIG. 4, each of the impedance elements 140 should have an impedance $2Z_0$, i.e., twice the characteristic impedance $Z_0$ of the communication line 115.

Control signals B1, B2, B3, and B4 control the activation of the switchable impedance element 120, 125, 130 and 135 of the integrated circuit 201. Likewise, control signals B5, B6, B7, and B8 control the enabling of the switchable impedance element 120, 125, 130 and 135 of the integrated circuit 251.

In operation, in order to facilitate reception of the transmitted signals, the port 200 or 250 can be configured in an input configuration wherein it activates its impedance elements 120 and 130 while deactivating impedance elements 125 and 135. Alternatively, the input configuration can be formed by activation of the impedance elements 125 and 135 and deactivation of the impedance elements 120 and 130. Further, the port 200 or 250 can transmit a communication signal at a first signal level by being configured in a transmit-first signal level configuration by activating impedance elements 120 and 125 while deactivating impedance elements 130 and 135. Likewise, the port 200 or 250 can transmit a communication signal at a second signal level by being configured in a transmit-second level configuration of activating impedance elements 130 and 135 while deactivating impedance elements 120 and 125. The first and second signal levels correspond to high and low signal or logic levels, respectively, based on the exemplary configurations of the ports 200 and 250 in FIG. 4.

More specifically, when transmitting a communication signal having a first signal level from port 200 to port 250, the port 250 is configured in its input configuration and the port 100 is configured in its transmit-first signal level configuration. As a consequence, the communication signal on the communication line 115 at the port 250 has a magnitude of 0.75 $V_P$. In a similar manner, if the port 200 uses a transmit-second signal level configuration then a communication signal of 0.25 $V_P$ would appear at the port 250. Likewise, when a communication signal is transmitted by port 250 to port 200, the port 200 is configured in its input configuration and the port 250 is configured in one of its transmit configurations. As a consequence, the communication signal on the communication line 115 at the port 200 would have a magnitude of 0.75 $V_P$ or 0.25 $V_P$ for the port 250 configured in its transmit-first or -second signal level configurations.

Thus, if the ports 200 and 250 adhere to the HSTL standard, power source voltages of $V_P-V_{SS}$=1.5 V can be used to produce first and second signal levels of 1.125 V and 0.375 V, respectively, which corresponds to those used in the conventional HSTL configurations, shown in FIGS. 1 and 2, as well as the embodiment of the invention shown in FIG. 3. Moreover, the embodiment of FIG. 4 can provide such function advantageously based on two power supplies instead of the three power supplies used in the embodiment of FIG. 3. However, such use of only two power supplies dissipates a larger amount of power than the three-power supply configuration of FIG. 3. More specifically, the power dissipated by either integrated circuit configuration 201 or 251 in FIG. 4 is: $P=V^2/R=(V_P-V_{SS})^2/2Z_0+(V_P-V_{SS})^2/Z_0W$= 5.6+11.2 mW=16.8 mW for the voltage divider providing the terminating impedance if characteristic impedance $Z_0$ of the transmission line 115 is 50 Ω.

Since the embodiment of FIG. 4 employs two power supplies but consumes greater power than the embodiment of FIG. 3, it is useable in those integrated circuit chip configurations where the use of a third power supply is not desirable and the needed number of adaptable input-output ports is relatively small such as, for example, less than ten. Moreover, it may be advantageous to employ the embodiment of FIG. 3 in those integrated circuit chips that require a larger numbers of adaptable input-output ports. Another alternative embodiment 300 of a controllable impedance arrangement in accordance with the invention is shown in FIG. 5. The arrangement 300 is capable of receiving and transmitting a communication signal in a format conforming to either the HSTL-class III or GTL standard with reduced power dissipation. These standards are described in greater detail in the previously cited EIA/JEDEC Standard 8-6 and "Gunning Transceiver Logic (GTL)-Low-Level, High-Speed Interface Standard for Digital Integrated Circuits", Electronic Industries Association, EIA/JEDEC Standard 8-3 (November 1993), which is incorporated by reference herein. In FIG. 5, an input buffer that couples to an interface 301 of the arrangement 300 has not been shown for ease of illustration. However, it should be readily understood that an integrated circuit configuration according to the invention would normally include such an input device. The interface 301 corresponds to the interface 103 of FIGS. 3 and 4. Also, the interface 301 is coupled to a communication line, such as the line 115 of FIGS. 3 and 4, which likewise has not been shown for ease of illustration.

The arrangement 300 is controlled by three control signals I/O, DATA, and TYPE. The control signal I/O causes the arrangement 300 to operate in either input or output configurations. When operating in an output configuration, the control signal DATA controls whether the arrangement 300 transmits a communication signal in a first or second signal level, respectively. Also, when operating in an output configuration, the control signal TYPE controls whether the transmitted communication signal is in a HSTL-class III format or a GTL format. The following table identifies the particular operation performed based on the particular signal levels of the control signals.

TABLE

| | Control Signals | | |
|---|---|---|---|
| Signal level | I/O | DATA | TYPE |
| high (1) | input | transmit high signal level | transmit signal in HSTL-class III format |
| low (0) | output | transmit low signal level | transmit signal in GTL format |

In the arrangement 300, the control signal I/O is provided to an inverter 305 as well as first control inputs of first and second transmission gates 310 and 315 which are further described below. The inverter 305 is further connected to second control inputs of the transmission gates 310 and 315. The control signals DATA and TYPE are provided to signal inputs of the transmission gates 310 and 315, respectively. Signal outputs of the transmission gates 310 are 315 are connected to inputs of NAND gate 320 and respective transistors 325 and 330. The transistors 325 and 330 are further connected to the inverter 305 and power supply $V_{DD}$. It is possible for the power supply $V_{DD}$ to be a voltage source providing a voltage on the order of 3.0 to 5.0 V.

An output of the NAND gate 320 is connected to an inverter 335 that is also connected to a gate of a transistor 340. The inverter 305 is further connected to another inverter 345 which is further connected to one input of a NOR gate 350. The control signal DATA is also provided to an inverter pair 355 that delays transmission of that control signal to a second input of the NOR gate 350. An output of the NOR gate 350 is connected to a gate of a transistor 360. Source and drain connections of the transistor 340 are coupled to a power supply $V_{DDQ}$ which, for example, provides an approximate voltage of 1.5 V in the configuration of FIG. 5, and the interface 301, respectively. Source and drain connections of the transistor 360 is coupled between the interface 301 and a voltage source $V_{SS}$, which can be ground of the corresponding chip.

The transmission gates 310 and 315 perform the function of either passing DC signals from the gates signal input to its signal output, or providing an open circuit between its signal input and signal output based on the signals at their control inputs. Exemplary transmission gates can be formed from coupling respective sources and drains of a N-MOS transistor and a P-MOS transistor to one another with their gates acting as the control signal inputs. The coupled transistors' sources and drains can then be used as the signal input and output.

Further, the transistor 340 is formed having a channel width and length such that when enabled it has a desired first impedance, such as impedance $Z_0$, between its source and drain. In a similar manner, the transistor 360 is formed having a channel width and length such that when enabled it has a desired second impedance, such as impedance $Z_0/3$, between its source and drain. The impedance $Z_0$ corresponds to the characteristic impedance of an associated communication lines such as the line 115 in FIGS. 3 and 4.

In operation, when the control signal I/O is at a high signal level to configure the arrangement 300 in an input configuration, the output of the inverter 305 goes to a low signal level deactivating the transmission gates 310 and 315 which blocks the control signals DATA and TYPE from the NAND gate 320. The low signal level of the inverter 305 output causes the output of the inverter 345 to go to a high signal level causing the NOR gate 350 to deactivate the transistor 360. The deactivation of the transistor 360 produces a substantial open circuit between the voltage source $V_{SS}$ and the interface 301. The low signal level of the inverter 305 output also causes the NAND to produce a low signal level at its output causing the inverter 335 to generate a high signal level activating the transistor 340. The activated transistor 340 provides an impedance $Z_0$ between the voltage source $V_{DDQ}$ and the interface 301. As a consequence, an equivalent circuit of the arrangement 300 in an input configuration can be represented by a terminating impedance $Z_0$ between the interface 301 and the voltage source $V_{DDQ}$.

Figure 6A:
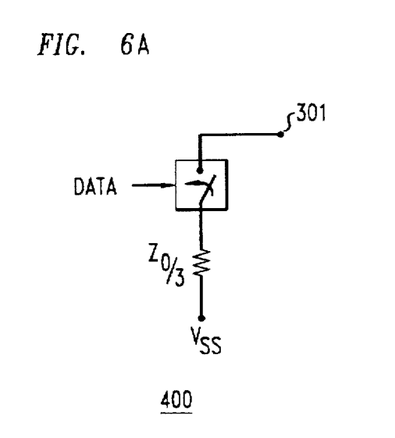
FIGS. 6A and 6B illustrate schematic block diagrams of equivalent circuit representations of the arrangement of FIG. 5 during operation of such arrangement.

In the alternative, when the control signal I/O is at a low signal level to operate the arrangement 300 in a transmit configuration, the output of the inverter 305 goes to a high signal level activating the transmission gates 310 and 315. The high signal level of the inverter 305 output further causes the NOR gate 350 to activate or deactivate the transistor 360 based on the low or high signal level of the control signal DATA, respectively. Since the transmission gates 310 and 315 are activated, the transistor 340 is deactivated if the control signal TYPE is in a low signal level to produce an equivalent circuit representation of a GTL driver 400 as shown in FIG. 6A. Further, if the control signal TYPE is at a high signal level causing the arrangement 300 to operate as a HSTL-class III driver, then the transistor 340 would be activated or deactivated based on the data signal DATA being at a high or low signal level, respectively. An equivalent circuit representation 500 of the arrangement 300 when configured as a HSTL-class III driver is shown in FIG. 6B.

In FIG. 6A, the GTL driver equivalent representation 400 provides an impedance $Z_0/3$ between $V_{SS}$ and the communication line when the control signal DATA is in a low signal level and an open circuit between such points when the control signal DATA is in a high signal level. The GTL driver configuration is produced by the arrangement 300 of FIG. 5 when both control signals I/O and TYPE are in a low signal level.

Figure 6B:
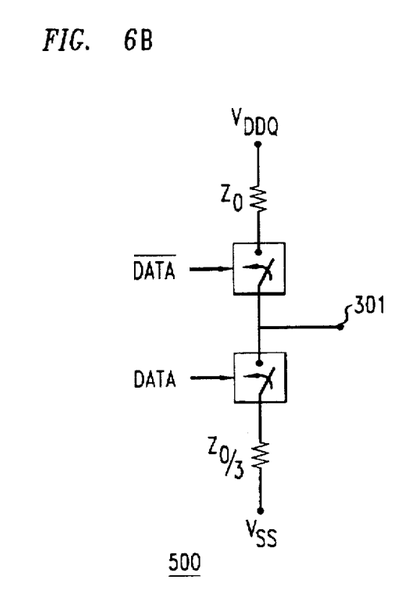

In FIG. 5, when the control signals I/O and TYPE are in low and high signal levels, respectively, the arrangement 300 operates as a HSTL-class III driver shown in FIG. 6B. In FIG. 6B, the equivalent circuit representation 500 includes an impedance $Z_0$ and first switch 510 connected in series between the voltage source $V_{DDQ}$ and the interface 301 of FIG. 5. The representation 500 further includes an impedance element $Z_0/3$ and a second switch 520 connected in series between the interface 301 and the voltage source $V_{SS}$. The control signal DATA causes the first switch 510 to close or open when it is at a high or low signal level, respectively. Conversely, the control signal DATA causes the second switch 520 to close or open when it is in a low or high signal level, respectively.

Accordingly, the equivalent circuit representation 500 transmits a signal at a low signal level on the interface 301 and corresponding communication line by opening switch 510 and disabling the impedance $Z_0$ while closing the switch 520 to connect the communication line to the impedance $Z_0/3$ and the voltage source $V_{SS}$. In a similar manner, the equivalent circuit representation 500 transmits a signal at a high signal level on the communication line by closing switch 510 and connecting the impedance $Z_0$ between the voltage source $V_{DDQ}$ and the communication line while opening the switch 520 disabling the impedance $Z_0/3$. The approximate power dissipation of the arrangement 300 of FIG. 5 as represented by the equivalent circuits 400 and 500 in FIGS. 6A and 6B is on the order of 17 mW for a 50% duty cycle in the communication signal, whether configured for transmitting GTL or HSTL-class III signals. Such a power dissipation is approximately one-half of that dissipated by conventional bi-directional input-output ports that transmit signals in such formats.

Although several embodiments of the invention have been described in detail above, many modifications can be made without departing from the teaching thereof. All of such modifications are intended to be encompassed within the following claims. For example, although the previously described embodiments transmit communication signals in accordance with the HSTL and GTL standards, it should be readily understood that an input-output port according to the invention can be employed to transmit and receive signals according to other standards, such as, example, complementary metal oxide semiconductor (CMOS), emitter-coupled-logic (ECL), transistor-transistor-logic (TTL), low-voltage-differential-swing (LVDS), and pseudo-emitter-coupled-logic(PECL). Also, such input-output ports can also be employed to transmit and receive signals in a manner not conforming to conventional standards or otherwise. The invention is particularly useful for interchip communication at data rates of 50 Mbits/s or greater, however, it is also useful for communicating at lower data rates.

The invention claimed is:

1. An integrated circuit chip comprising:
   at least one adaptive input-output port, said port comprising:
      an input buffer;
      a controllable impedance arrangement coupled to said buffer and to at least two power supplies, said impedance arrangement for coupling to a communication line for transmitting and receiving data signals over said line; and
      said controllable impedance arrangement for transmitting a data signal in a particular logic state by providing a corresponding particular impedance between at least one of said power supplies and said communication line, and for providing another particular impedance corresponding to a terminating impedance between at least one of said power supplies and said line when receiving a data signal over said line.

2. The chip of claim 1 wherein said controllable impedance arrangement comprises an interface for coupling to said communication line and at least one switchable impedance element coupled between each power supply and said interface.

3. The chip of claim 2 further comprising a third power supply wherein the switchable impedance element between the respective power supplies are alternatively switchable to provide respective high and low signal levels on the interface for transmission as well as a terminating impedance for receiving a communication signal.

4. The chip of claim 2 wherein at least two switchable impedance elements are coupled between at least one power supply and said interface and wherein at least one of said impedance elements is switchable for providing a terminating resistance and also switchable in conjunction with switching of another impedance element for providing a signal of a particular level on said interface.

5. The chip of claim 2 wherein at least two switchable impedance elements are coupled between at least one power supply and said interface and wherein at least one of said impedance elements is switchable in conjunction with switching of another impedance element for providing a terminating resistance and also switchable for providing a signal of a particular level on said interface.

6. The chip of claim 2 wherein said switchable impedance element is a transistor which when enabled provides a particular impedance between a particular power supply and said interface.

7. The chip of claim 2 wherein said switchable impedance element is an impedance element coupled to a switch.

8. The chip of claim 1 wherein said chip is able to transmit and receive a communication signal in accordance with at least one of Gunning-transceiver-logic or high-speed-transceiver-logic standards.

9. The chip of claim 1 wherein said impedance arrangement for coupling to a communication line having a transmission line configuration and wherein said particular impedances of said controllable impedance arrangement is based on a characteristic impedance of said communication line.

10. An electrical system comprising:

a substrate;

at least one integrated circuit chip in accordance with claim 1 disposed on said substrate; and at least one interconnect disposed on said substrate coupled to at least one of the input-output ports of said chip.

* * * * *